(12) United States Patent
Gorrilla

(10) Patent No.: US 10,626,921 B2
(45) Date of Patent: Apr. 21, 2020

(54) METHOD AND APPARATUS FOR REDUCING WEAR OF HYDRODYNAMIC BEARING

(71) Applicant: General Electric Company, Schenectady, NY (US)

(72) Inventor: Michael William Gorrilla, West Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 344 days.

(21) Appl. No.: 15/827,887

(22) Filed: Nov. 30, 2017

(65) Prior Publication Data

US 2019/0162237 A1    May 30, 2019

(51) Int. Cl.
*H01J 35/10* (2006.01)
*F16C 39/06* (2006.01)
*F16C 32/04* (2006.01)

(52) U.S. Cl.
CPC .......... *F16C 39/06* (2013.01); *F16C 32/0402* (2013.01); *F16C 32/0476* (2013.01); *F16C 2210/08* (2013.01); *F16C 2380/16* (2013.01)

(58) Field of Classification Search
CPC ........ F16C 33/107; F16C 33/00; F16C 43/00; F16C 43/02; H01J 35/305; H01J 35/26; H01J 35/103; H01J 35/1046; H01J 2235/1026; H01J 2235/086; H01J 35/101; H01J 35/10
See application file for complete search history.

(56) References Cited

U.S. PATENT DOCUMENTS

2017/0309435 A1* 10/2017 Yonezawa ............... H01J 35/10

* cited by examiner

*Primary Examiner* — Don K Wong
(74) *Attorney, Agent, or Firm* — Boyle Fredrickson, S.C.

(57) ABSTRACT

A hydrodynamic or liquid metal or bearing structure for an x-ray tube and associated process for operating the bearing structure is provided that includes a bearing shaft rotatably disposed in a bearing housing or sleeve. Adjacent but separated by a gap from the portion of the sleeve enclosing the thrust flange is located an electromagnet. The electromagnet can be selectively operated in order to exert a magnetic force upon a permanent magnet disposed within the sleeve on the opposite side of the gap. The force exerted on the permanent magnet in the sleeve causes the sleeve to move axially along the shaft, such that the sleeve can engage one side of the thrust flange, landing the sleeve against the thrust bearing/surface to greatly reduce the wear on the sleeve as the sleeve rotation slows.

20 Claims, 3 Drawing Sheets

METHOD AND APPARATUS FOR REDUCING WEAR OF HYDRODYNAMIC BEARING

BACKGROUND OF THE DISCLOSURE

The invention relates generally to x-ray tubes, and more particularly to structures and methods of assembly and operation for a hydrodynamic bearing utilized in an x-ray tube.

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

X-ray tubes include a cathode and an anode located within a high-vacuum environment. In many configurations, the anode structure is supported by a hydrodynamic or liquid metal bearing structure, e.g., a spiral groove bearing (SGB) structure, formed with a support shaft disposed within a sleeve or shell to which the anode is attached and that rotates around the support shaft. The spiral groove bearing structure also includes spiral or helical grooves on various surfaces of the sleeve or shell that serve to take up the radial and axial forces acting on the sleeve as it rotates around the support shaft.

Typically, an induction motor is employed to rotate the anode, the induction motor having a cylindrical rotor built into an axle formed at least partially of the sleeve that supports the anode target and an iron stator structure with copper windings that surrounds an elongated neck of the x-ray tube. The rotor of the rotating anode assembly is driven by the stator. The x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. This places stringent demands on the bearings and the material forming the anode structure, i.e., the anode target and the sleeve and shaft assembly supporting the target.

Advantages of hydrodynamic or liquid metal bearings such as spiral groove bearings in x-ray tubes include a high load capability and a high heat transfer capability due to an increased amount of contact area. Other advantages include low acoustic noise operation as is commonly understood in the art. Gallium, indium, or tin alloys are typically used as the liquid metal in the hydrodynamic bearing structure, as they tend to be liquid at room temperature and have adequately low vapor pressure, at operating temperatures, to meet the rigorous high vacuum requirements of an x-ray tube.

However, hydrodynamic bearings with liquid metal working fluids typically contain one or more journal bearings and one or more thrust bearings. For hydrodynamic bearings, journal bearings are typically concentric cylinders with a small radial gap for working fluid whereas thrust bearings are typically flat parallel flanges with a small axial gap for working fluid. A common issue with these types of bearings is they have zero load capacity when not rotating or when the speed of rotation is low enough for the liquid metal to be unable to support the rotating component of the bearing assembly. As such, when the hydrodynamic bearing slows below a certain minimum rotational speed at which the liquid metal can support the rotating component, e.g., the sleeve, the sleeve tends to land on/contact the non-rotating component at some non-zero rotational speed. This surface to surface relative motion between the rotating and non-rotating bearing components causes wear and reduces life and performance of the bearing assembly. The rotating sleeve conventionally lands upon the non-rotating component/shaft of the bearing assembly (the journal bearing) which inherently has small contact surface areas (nearly line contacts), thereby creating a large landing stress. Landing of hydrodynamic bearings upon journal bearings is a major source of wear in the hydrodynamic bearing assembly and is a significant failure mode for x-ray tubes. Undesirable wear is also associated with hydrodynamic bearing take-off, that is, driving the rotating component from rest to the required operational frequency. During take-off, the rotating component briefly does not have sufficient relative speed to the stationary component for the working fluid to support the required load, thus bearing surfaces rub and cause wear as described previously.

Therefore, it is desirable to develop a structure and method for the operation of a bearing assembly or structure for an x-ray tube that reduces the stresses on the rotating component of the bearing assembly to significantly decrease wear resulting from the landing or take-off of the rotating bearing component on the non-rotating component, resulting in increased useful life for the bearing assembly.

BRIEF DESCRIPTION OF THE DISCLOSURE

In the present disclosure a liquid metal or hydrodynamic bearing assembly or structure for an x-ray tube and associated process for manufacturing and operating the bearing assembly to reduce wear on landing the rotating component of the bearing assembly on the non-rotating component is described. The bearing assembly can be formed with any suitable structure, such as a cantilevered bearing, or a straddle bearing assembly provided that it includes a bearing shaft disposed within a bearing sleeve that rotates around the bearing shaft, or vice versa. The shaft may include a pair of journal bearings extending outwardly from opposite sides of a thrust flange that extends radially outwardly from the shaft. The sleeve is formed complementary to the shaft to enclose the journal bearings and the thrust flange and to retain the liquid metal bearing fluid between the shaft and sleeve in the bearing assembly.

Adjacent but separated by a gap from the portion of the sleeve enclosing the thrust flange is located an electromagnet. The electromagnet can be selectively operated in order to exert a magnetic force upon a permanent magnet (or ferromagnetic material) disposed within the sleeve on the opposite side of the gap. The force exerted on the permanent magnet in the sleeve causes the sleeve to move axially along the shaft, such that the sleeve can engage one side of the stationary thrust flange. As the contact areas (landing areas) of the thrust bearing surfaces on each side of the thrust flange are significantly larger than the bearing surfaces on each of the journal bearings, preferential landing of the sleeve upon a thrust bearing surface is preferred due to decreased stress and thus wear. Landing upon the thrust bearing and not upon the journal bearings eliminates journal bearing landing wear. Journal bearings are the primary load carrying bearings in x-ray tubes during operation especially those used in computed tomography systems, thus is it desirable to minimize their wear. The electromagnet is sized such that it may provide suitable axial load to the rotating sleeve such that the sleeve will land upon either of the thrust bearings prior to the journal bearing landing, thus, the journal bearing never lands, eliminating associated wear. Further, the electromagnet can apply the axial force on the permanent magnet to move the sleeve in either axial direction, allowing the different areas of the sleeve to contact different thrust bearing surfaces, thereby further reducing the wear on the thrust bearings increasing the operational or useful life of the bearing assembly. Further, while the electromagnet is energized and the sleeve has landed upon the thrust bearing, the journal bearings are not in contact and thus have a working fluid gap. If bearing take-off is required, the stator may drive the bearing rotor and the energized electromagnet magnet acting upon the sleeve may ramp to a de-energized state, this action is performed simultaneously such that the bearing takes off from the thrust bearing and not the journal bearings, eliminating take-off wear of the journals. If the electromagnet is de-energized post thrust bearing landing (possibly due to electrical power loss), the sleeve may slip (due to gravity) such that the journal bearings are in contact, in this case the electromagnet would remain de-energized at take-off and a conventional journal bearing take-off would occur and would wear the journals conventionally; thus, it is desirable for the electromagnet to remain energized post thrust bearing landing.

In one exemplary embodiment of the invention, a bearing assembly includes a shaft including a thrust flange thereon, the thrust flange including a pair of opposed thrust surfaces, a sleeve rotatably disposed around the shaft and including a radial cavity disposed around the thrust flange and a pair of radial surfaces disposed adjacent each of the pair of thrust surfaces and an electromagnet spaced from the sleeve and operable to move the sleeve axially along the shaft to engage one of the radial surfaces with one of the thrust surfaces.

In another exemplary embodiment of the invention, an x-ray tube has a cathode assembly; and an anode assembly spaced from the cathode assembly, wherein the anode assembly includes a sleeve including a magnetic portion and defining a radial cavity defined in part by a pair of opposed radial surfaces, a shaft rotatably disposed within the sleeve and including a thrust flange located within the radial cavity and having a pair of thrust surfaces adjacent the pair of radial surfaces, an electromagnet spaced from the magnetic portion of the sleeve and operable to exert a force on the magnetic portion of the sleeve and an anode target operably connected to the sleeve In an exemplary embodiment of the method of the invention, a method for reducing wear on a bearing assembly within an x-ray tube includes the steps of providing an x-ray tube having a cathode assembly and an anode assembly spaced from the cathode assembly, wherein the anode assembly includes a sleeve including a magnetic portion and defining a radial cavity defined in part by a pair of opposed radial surfaces, a shaft rotatably disposed within the sleeve and including a thrust flange located within the radial cavity and having a pair of thrust surfaces adjacent the pair of radial surfaces, an electromagnet spaced from the magnetic portion of the sleeve and operable to exert a force on the magnetic portion of the sleeve and an anode target operably connected to the sleeve, and energizing the electromagnet to move one of the radial surfaces into engagement with an adjacent thrust surface.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DISCLOSURE

Figure 1:
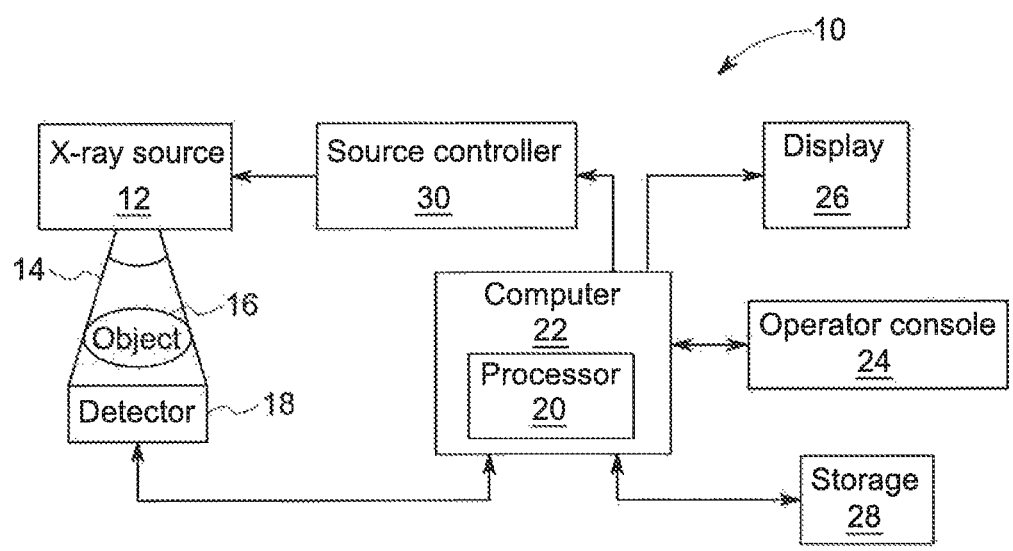
FIG. 1 is a block diagram of an imaging system incorporating exemplary embodiments of the invention.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from thirty (30) keV to two hundred (200) keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 2:
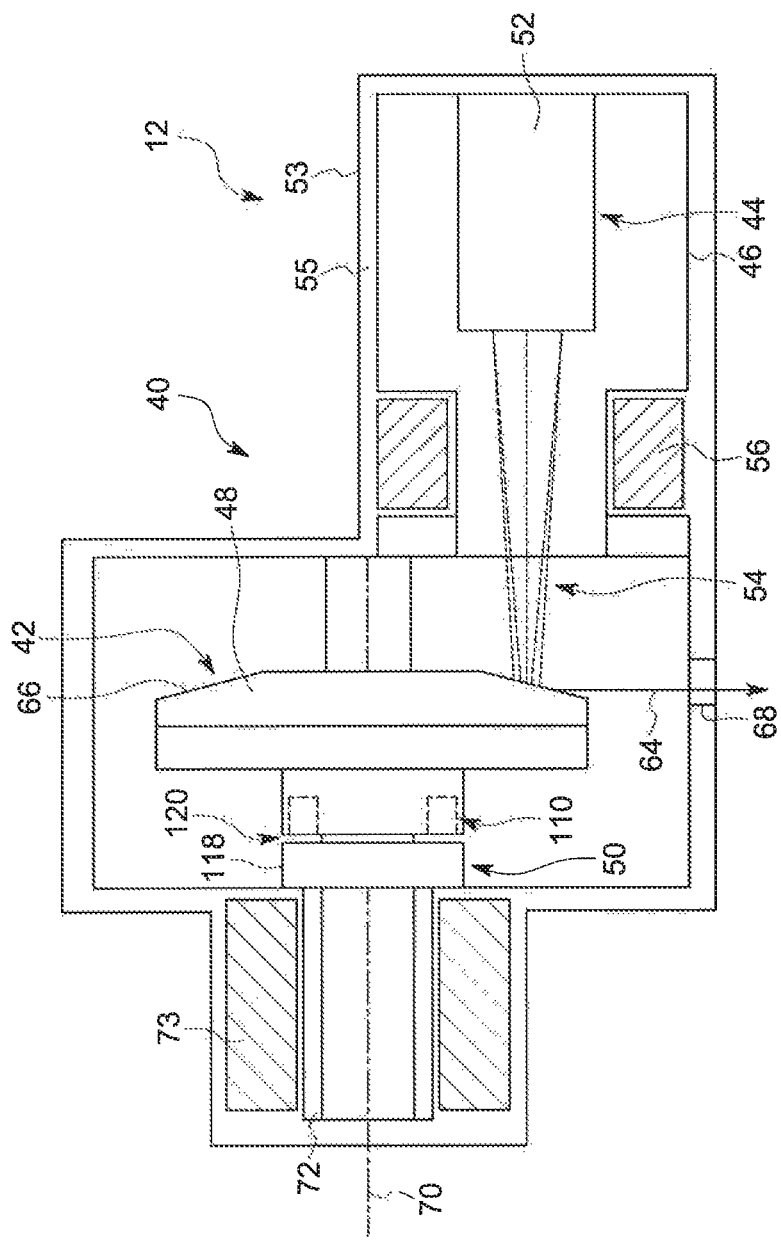
FIG. 2 is a cross-sectional view of a portion of an x-ray tube according to an exemplary embodiment of the invention and usable with the system illustrated in FIG. 1.

FIG. 2 illustrates a cross-sectional view of an x-ray source 12 incorporating embodiments of the invention. In the illustrated embodiment, x-ray source 12 is formed of an x-ray tube 40 that includes an anode assembly 42 and a cathode assembly 44. X-ray tube 40 is supported by the anode and cathode assemblies 42, 44 within a casing 46, which houses a target or anode 48, a bearing assembly 50, and a cathode 52. Casing 46 defines an area of relatively low pressure (e.g., a vacuum) 30 compared to ambient, in which high voltages may be present. Casing 46 may be positioned within a frame 53 filled with a cooling medium 55, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads (not shown). The electrical signals may be timing/control signals that cause cathode 52 to emit the electron beam 54 at one or more energies and at one or more frequencies. The electrical signals may also at least partially control the potential between cathode 52 and anode 48. Optics 56 are spaced from the cathode 52 and operate as an electrostatic lens that focuses electrons emitted from the cathode 52 to direct the electron beam 54 onto a focal surface 66 on the target 48.

X-rays 64 are produced when high-speed electrons of electron beam 54 are suddenly decelerated when directed from the cathode 52 to a target or focal surface 66 formed on target 48 via a potential difference therebetween of, for example, sixty (60) thousand volts or more in the case of CT applications. The x-rays 64 are emitted through a radiation emission passage 68 formed in casing 46 and frame 53 toward a detector array, such as detector 18 of FIG. 1.

Anode assembly 42 includes a rotor 72 and a stator 73 partially surrounding rotor 72 for causing rotation of anode 48 during operation. Target 48 is supported in rotation by a bearing assembly 50, which, when rotated, also causes target 48 to rotate about the centerline 70.

Target 48 may be manufactured to include a number of metals or composites, such as tungsten, molybdenum, or any material that contributes to Bremsstrahlung (i.e., deceleration radiation) when bombarded with electrons. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46, in a CT application, the x-ray source 40 as a whole is caused to rotate about an object, such as object 16 of imaging system 10 in FIG. 1, at rates of typically 1 Hz or faster.

Bearing assembly 50 can be formed as necessary, such with a number of suitable ball bearings (not shown), but in the illustrated exemplary embodiment comprises a liquid lubricated or self-acting bearing having adequate load-bearing capability and acceptable acoustic noise levels for operation within imaging system 10 of FIG. 1. As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as sleeve 78 to which the target 48 is attached. While center shaft 76 is described with respect to FIG. 2 as the stationary portion of bearing assembly 50 and sleeve 78 is described as the rotating portion of bearing assembly 50, embodiments of the present invention are also applicable to embodiments wherein center shaft 76 is a rotary shaft and sleeve 78 is a stationary component. In such a configuration, target 48 would rotate as center shaft 76 rotates.

Figure 3:
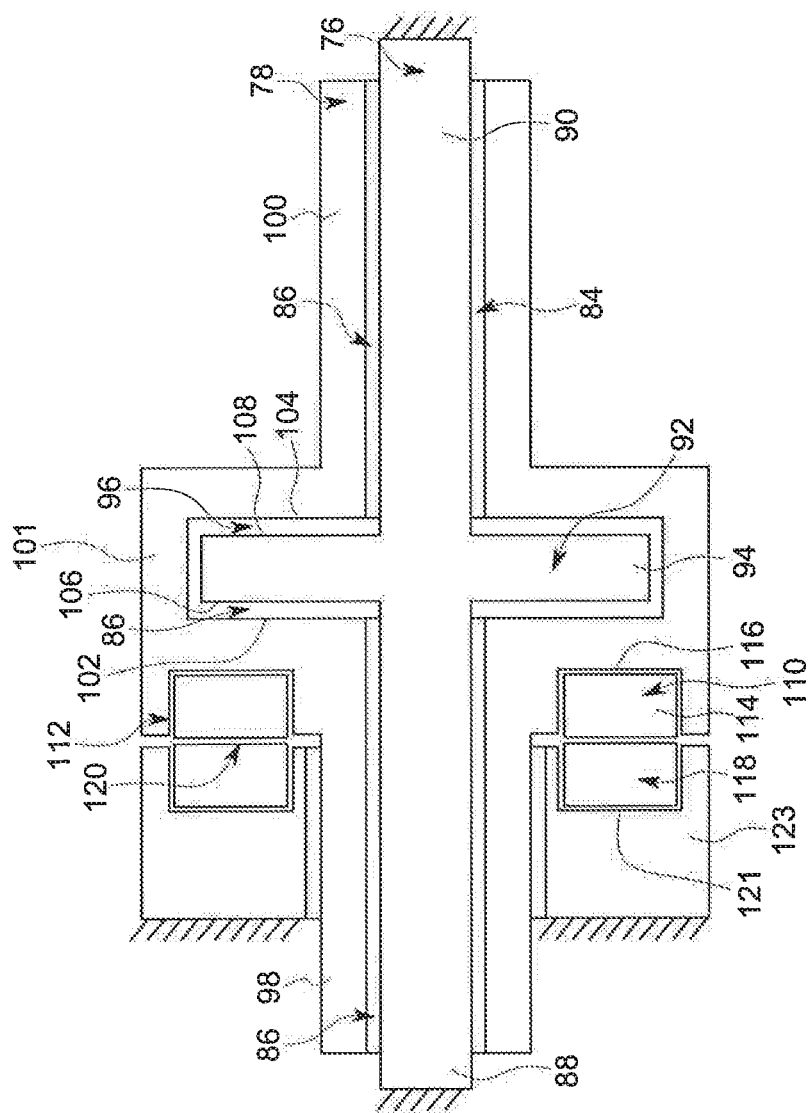
FIG. 3 is a cross-sectional side plan view of a bearing structure of an x-ray tube in accordance with an exemplary embodiment of the invention.

Referring now to FIGS. 2 and 3, a cross-sectional view of a portion of bearing assembly or structure 50 is shown according to an embodiment of the invention. Bearing assembly 50 includes a center shaft 76 positioned within sleeve 78, which is configured to support an anode (not shown), such as target 48 of FIG. 2. A lubricant 84 is positioned in a gap 86 formed between center shaft 76 and sleeve 78. In embodiments of the invention, lubricant 84 is a metal or metallic alloy that exists in a liquid state at operating temperature of bearing assembly 50.

The lubricating fluid 84 flowing between the rotating and stationary components of the bearing assembly or structure 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context, low vapor pressures may generally be in the range of $1 \times 10^{-5}$ Torr. In other words, fluids that are stable in vacuums are desirable for use in x-ray tube systems so as to not adversely affect the established vacuum during operation of the system. In the present disclosure, lubricant 84 may be gallium or a gallium alloy as non-limiting examples.

In the embodiment illustrated in FIG. 3, center shaft 76 of bearing assembly 50 is a stationary component and shell 78 is a rotatable component constructed to rotate about center shaft 76. However, one skilled in the art will recognize the inventive concepts described herein are applicable to alternative bearing configurations. As one example, bearing assembly 50 may instead include a stationary outer component and a rotating center shaft comprising a target attached thereto. As another example, and as illustrated in the exemplary embodiment of FIGS. 2 and 3, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, the embodiments of the invention disclosed herein are applicable to any bearing configuration having a rotatable component and a stationary component, and a liquid lubricant therebetween, regardless of configuration or application.

As illustrated in FIG. 3, center shaft 76 of bearing assembly 50 includes a pair of journal bearings 88,90 extending outwardly form opposite sides of a radial projection 92 comprising a thrust flange 94 that extends radially outwardly from center shaft 76 and is positioned in a radial cavity 96 of sleeve 78. In the exemplary embodiment where the shaft 76 forms the stationary or non-rotating component of the straddle bearing assembly 50, the ends of each journal bearing 88,90 opposite the thrust flange 94 can be affixed to the casing 46. The sleeve 78 is formed complementary to the shaft 76 and includes a pair of collars 98,100 disposed around the journal bearings 88,90 and extending outwardly from opposed sides of a central portion 101 of the sleeve 78 within which is defined the radial cavity 96.

The radial cavity 96 includes a pair of radial surfaces 102,104 spaced from thrust bearings/surfaces 106,108 on opposed sides of the thrust flange 94 by the lubricant 84 disposed within the gap 86 between radial projection 92 and radial cavity 96. Radial projection 92 limits axial motion of sleeve 78 relative to center shaft 76, and, as illustrated, need not be limited in axial length, but may be extended in axial length to provide additional mechanical support of components.

The central portion 101 also includes a number of magnetic portions 110 located within a corresponding number of apertures 112 formed in the central portion 101. In the illustrated exemplary embodiment of FIG. 3, the magnetic portion 110 can be a circular, ring-shaped permanent magnet 114 disposed within a circumferential recess 116 formed in the central portion 101 around the collar 98, where the recess 116 does not intersect the radial cavity 96. In other embodiments the magnetic portions 110 can be formed from individual permanent magnets (not shown) spaced within apertures 112 disposed equidistant from one another around the perimeter of the central portion 101. Alternatively, the magnetic portion(s) 110 can be formed as a ferromagnetic component or section of the central portion 101 or as a ferromagnetic insert (not shown) disposed within the central portion 101.

The bearing assembly also includes an electromagnet 118 disposed adjacent the magnetic portion(s) 110 but separated from the magnetic portion(s) 110 by a gap 120. In the exemplary embodiment of FIG. 2, the electromagnet 118 is disposed within the casing 46, such as within a recess 121 formed in a suitable housing 123 within the casing 46, but the exemplary embodiment of FIG. 3 shows the electromagnet 118 can also be located outside of the casing 46 and can operate through a permeable barrier of a suitable construction.

In the straddle mounted bearing assembly 50 of FIG. 3, the bearing assembly 50 has two journal bearings 88,90 which take the radial load, i.e., the weight of rotating assembly and the inertial load resulting from use in a CT system application. Due to x-ray tube system architecture, when hydrodynamic bearings are slowed to a stop, the sleeve 78 lands upon the journal bearings 88,90 creating a major source of wear. In contrast, the thrust bearings 106, 108 are necessary to keep the rotating assembly fixed axially but are lightly loaded when the bearing assembly 50 is slowed and/or stopped as there are minimal axial loads on the thrust bearings/surfaces 106,108. The thrust bearings/surfaces 106,108 are flat and are able to have large/uniform contact area simultaneously upon landing.

In operation, to slow and/or stop the bearing assembly 50, the stator 73 is de-energized and the bearing assembly 50 is allowed to coast upon reaching a low rotational speed, such as 10 Hz or below. At this rotational speed, the journal bearings 88,90 take the entire radial load, but the thickness of the metal fluid lubricant is still sufficient to separate the sleeve 78 from the shaft 76. As the bearing assembly 50 rotational speed slows closer to 0 Hz, the working/metal fluid film gap gets smaller and smaller due to the increased load and the reduced viscosity of the metal fluid lubricant resulting from the heating of the metal fluid during operation of the tube 12. At a safe rotational speed below 10 Hz (e.g., between 3 Hz-8 Hz, or 5 Hz), but above that speed at which the sleeve 78 will land on the journal bearings 88,90 which is approximately 1 Hz-2 Hz, the electromagnet 118 is energized to apply an axial load to the sleeve 78. In particular, when the electromagnet 118 is energized, the electromagnet 118 exerts an axial load upon the magnetic portions 110 within the central portion 101 of the sleeve 78 in either the push or pull directions, depending upon the operation of the electromagnet 118 or the orientation/polarity of the magnetic portion(s) 110. In addition, the smaller the gap 120 between the electromagnet 118 and the attractive or repulsing region/magnetic portion(s) 110 of the sleeve 78 the greater the generated force for a given magnet current through the electromagnet 118. In an exemplary embodiment, the gap 86 has a width of approximately 5-20 microns, with the vacuum gap 120 having a width in the range of 0.5-1 mm. With these dimensions, the force exerted by the electromagnet 118 on the magnetic portion(s) 110 will urge the sleeve 78 into the desired contact with the thrust bearing(s)/surface(s) 106,108 without the electromagnet 118 coming into contact with the sleeve 78.

The load exerted by the electromagnet 118 forces one of the radial surfaces 102,104 into engagement with the adjacent thrust bearings/surfaces 106,108, such that the sleeve 78 lands on the thrust bearing 106,108 prior to landing on the journal bearings 88,90. Further, once landed, the axial load from the electromagnet 118 and coefficient of static friction between the radial surfaces 102,104 and the thrust bearings/surfaces 106,108 keeps the sleeve 78 from landing or otherwise contacting the journal bearings 88,90. The landing of the sleeve 78 on the upon thrust bearings/surfaces 106, 108 greatly reduces wear on the sleeve 78 as the thrust bearings 106,108 are flat with a much larger and parallel contact area, compared to the journal bearings 88,90, such that the thrust bearings/surfaces 106,108 are able to have large/uniform contact area simultaneously upon landing which lends the thrust bearings/surfaces 106,108 to better landing and take-off for the bearing assembly 50.

After the bearing assembly 50 has stopped, the electromagnet 118 may be de-energized and the sleeve 78 may then slip into contact with the shaft 76 for the next use (boost/takeoff). According to the disclosed structure of the bearing assembly 50 and the method of operation, the bearing assembly 50 can be operated to force the sleeve 78 to entirely land upon the thrust bearing(s)/surface(s) 106,108 regardless of the orientation of the bearing assembly 50. Further, the engagement of the sleeve 78 can be alternated between the thrust bearings/surfaces 106,108 by oppositely energizing the electromagnet 118 to selectively push or pull the magnetic portion(s) 110 relative to the electromagnet 118 in order to spread wear across both radial surfaces 102,104 and thrust bearings/surfaces 106,108 thereby increasing operational life and reliability for the bearing assembly 50 and x-ray source 12. In an alternative embodiment, the electromagnet 118 can be energized in a manner that enables the bearing assembly 50 to share of landing stress/load as desired between the thrust bearings/surfaces 106,108 and the journal bearings 88,90 regardless of bearing orientation.

In an alternative embodiment, the electromagnet 118 can be continually energized in order to prevent contact between the sleeve 78 and the journal bearings 88,90. Upon subsequent operation of the tube 12 and bearing assembly 50, the stator 73 could can load the rotor 72 but not overcome the friction generated in the thrust bearings/surfaces 106,108. At a specified time, the electromagnet 118 can be de-energized and to enable allow an abrupt kick-start of rotation of the sleeve 78 relative to the shaft 76, such that the journal bearings 88,90 do not contact the sleeve 78.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly comprising:
   a shaft including a thrust flange thereon, the thrust flange including a pair of opposed thrust surfaces;
   a sleeve rotatably disposed around the shaft and including a radial cavity disposed around the thrust flange and a pair of radial surfaces disposed adjacent each of the pair of thrust surfaces; and
   an electromagnet spaced from the sleeve and operable to move the sleeve axially along the shaft to engage one of the radial surfaces with one of the thrust surfaces.

2. The bearing assembly of claim 1, wherein a portion of the sleeve is ferromagnetic.

3. The bearing assembly of claim 2, wherein the ferromagnetic portion of the sleeve is a ferromagnetic insert disposed in the sleeve.

4. The bearing assembly of claim 1, further comprising a permanent magnet disposed within the sleeve adjacent the electromagnet.

5. The bearing assembly of claim 4, wherein the permanent magnet is a number of permanent magnets spaced equidistant from one another around a perimeter of the sleeve.

6. The bearing assembly of claim 1, wherein the electromagnet is operable to pull the sleeve toward the electromagnet.

7. The bearing assembly of claim 1, wherein the electromagnet is operable to push the sleeve away from the electromagnet.

8. The bearing assembly of claim 1, wherein the electromagnet and the sleeve are spaced from one another to define a gap therebetween.

9. The bearing assembly of claim 1, wherein the bearing assembly is a straddle bearing assembly.

10. An x-ray tube comprising:
    a cathode assembly; and
    an anode assembly spaced from the cathode assembly, wherein the anode assembly comprises:
    a sleeve including a magnetic portion and defining a radial cavity defined in part by a pair of opposed radial surfaces;
    a shaft rotatably disposed within the sleeve and including a thrust flange located within the radial cavity and having a pair of thrust surfaces adjacent the pair of radial surfaces;
    an electromagnet spaced from the magnetic portion of the sleeve and operable to exert a force on the magnetic portion of the sleeve; and
    an anode target operably connected to the sleeve.

11. The x-ray tube of claim 10, wherein the magnetic portion is a ferromagnetic portion of the sleeve.

12. The x-ray tube of claim 10, wherein the magnetic portion is a ferromagnetic insert disposed within the sleeve.

13. The x-ray tube of claim 10, wherein the magnetic portion is a permanent magnet disposed within the sleeve.

14. The x-ray tube of claim 13, wherein the permanent magnet is a number of permanent magnets spaced equidistant from one another around a perimeter of the sleeve.

15. A method for reducing wear on a bearing assembly within an x-ray tube, the method comprising the steps of:
    providing an x-ray tube comprising:
    a cathode assembly; and
    an anode assembly spaced from the cathode assembly, wherein the anode assembly comprises:
    a sleeve including a magnetic portion and defining a radial cavity defined in part by a pair of opposed radial surfaces;
    a shaft rotatably disposed within the sleeve and including a thrust flange located within the radial cavity and having a pair of thrust surfaces adjacent the pair of radial surfaces;
    an electromagnet spaced from the magnetic portion of the sleeve and operable to exert a force on the magnetic portion of the sleeve; and
    an anode target operably connected to the sleeve; and
    energizing the electromagnet to move one of the radial surfaces into engagement with an adjacent thrust surface.

16. The method of claim 15, wherein the step of energizing the electromagnet comprises attracting the magnetic portion of the sleeve towards the electromagnet.

17. The method of claim 15, wherein the step of energizing the electromagnet comprises repelling the magnetic portion of the sleeve away from the electromagnet.

18. The method of claim 15 wherein the step of energizing the electromagnet prevents contact of the sleeve with the shaft other than at the radial surfaces.

19. The method of claim 15 wherein the step of energizing the electromagnet comprises energizing the electromagnet at a rotational speed for the bearing assembly above a speed at which the sleeve contacts the shaft outside of the pair of radial surfaces.

20. The method of claim 19 wherein the step of energizing the electromagnet comprises energizing the electromagnet at a rotational speed for the bearing assembly of about 3 Hz.

* * * * *